United States Patent [19]

Hegeler et al.

[11] 3,949,401

[45] Apr. 6, 1976

[54] FREQUENCY IDENTIFICATION CIRCUIT FOR BROADCAST TRAFFIC INFORMATION RECEPTION SYSTEMS

[75] Inventors: Wilhelm Hegeler; Lambert Maschmeyer; Hans Rasehorn, all of Hildesheim, Germany

[73] Assignee: Blaupunkt-Werke GmbH, Hildesheim, Germany

[22] Filed: Feb. 21, 1975

[21] Appl. No.: 551,689

[30] Foreign Application Priority Data

Feb. 25, 1974 Germany ............................ 2408947

[52] U.S. Cl. ................ 343/200; 325/55; 340/171 R

[51] Int. Cl.[2] ............................................ H04B 7/00

[58] Field of Search ...... 343/200, 225; 325/64, 466, 325/48, 55, 53–54; 179/15 BP; 340/225, 171 R, 171 A, 171 PF; 324/77 G, 77 H; 328/138, 139

[56] References Cited

UNITED STATES PATENTS

| | | | |
|---|---|---|---|
| 2,429,607 | 10/1947 | Capen | 343/200 X |
| 3,746,991 | 7/1973 | Gautney | 325/64 X |
| 3,824,469 | 7/1974 | Pistonbatt | 325/53 X |

*Primary Examiner*—Benedict V. Safourek
*Assistant Examiner*—Robert Hearn
*Attorney, Agent, or Firm*—Flynn and Frishauf

[57] ABSTRACT

Frequencies which respectively identify a particular transmitter, and a particular program content, and which are in a very low frequency range (from between 20 to 125 kHz can be recognized, and ditigal output control signals derived representative of whether one, or both, or none of these frequencies are present by use of a frequency selection input circuit, controlled by a change-over switch to initially select recognition of the transmitter identification which, if positive, is applied through a storage circuit having a storage time substantially longer than the switch-over rate, to provide an output signal if the selected transmitter is recognized, and hold that output signal during switch-over of the program content identification signal which, if present, will be fed back through a logic circuit to hold the output of the transmitter identification circuit as identified, and if not present, permit continued switch-over of the frequency identification circuit to continue to store transmitter identification signals, if present, but permit these signals to disappear, after the storage time, if the transmitter identification signals also cease. The time delay and storage circuit preferably include operational amplifiers, and the frequency identification circuit includes a phase-locked loop.

7 Claims, 3 Drawing Figures

FREQUENCY IDENTIFICATION CIRCUIT FOR BROADCAST TRAFFIC INFORMATION RECEPTION SYSTEMS

The present invention relates to circuit arrangements useful in the field of broadcast traffic information systems, and more particularly to a circuit which automatically checks if a transmitter radiates a particular region identification frequency and, further, which automatically checks for the presence of a traffic announcement identification frequency.

In the Federal Republic of Germany, broadcast stations periodically radiate supra-regional, as well as regional traffic announcements. To be able to distinguish traffic announcements from normal broadcast programs, the transmitters radiate suitable identification frequencies. Since 1972, those of the transmitter stations which transmit traffic announcements radiate, in addition to their program content, a 57 kHz pilot tone. This pilot tone is normally not heard, and corresponds, to some extent, to the pilot used to transmit so-called "storecast" information under the Subsidiary Communications Authorization (SCA) of the frequency modulation spectrum, authorized for radio stations in the United States.

Regional identification systems were described in the literature, see, for example:

"Funktechnik", vol. 15 (1973), page 528;

"Traffic Information Broadcasting", Wireless World, May 1973, pages 238 to 240;

"Traffic Information Broadcasting in West Germany", "Wireless World", April 1974, pages 95 to 97;

"Funkschau", 1974, vol. 14, pages 535 to 538, article by Joachim Conrad;

"Rundfunktechnische Mitteilungen", vol. 18 (1974), issue No. 4, pages 193 to 202, article by Peter Bragas;

"Der blaue Punkt", "Blaupunkt-Information fur den Fachhandel", issued entitled "Dokumentation uber das Autofahrer Rundfunk-Informations System", issued by Verkauf/Marketing (VKM) der Blaupunkt-Werke GmbH, 32 Hildesheim, Robert-Borsch-Strasse 200, Germany ("The blue point", "Blue point information for the industry"; documentation relating to motorist broadcast information systems, issued by sales and marketing department of Blaupunkt-Werke GmbH).

The traffic information systems described in the foregoing literature, briefly, rely on FM transmitters which, between themselves, cover the entire region subject to the traffic identification system, in this case the entire nation. Selecting, as an example, the traffic corridor Washington-Philadelphia, for example, one FM transmitter, each, in Washington, Baltimore, Havre de Grace, Md., Wilmington, and Philadephia would radiate the 57 kHz pilot tone in addition to its normal entertainment program. A motorist travelling from Washington northward, for example, would be interested in the immediate traffic conditions in the Washington area. To further identify the transmitters, and eliminate response of the receiver to transmitters of overlapping range (as the Baltimore transmitter would have in the Washington region), the 57 kHz signal is additionally modulated by a region modulation frequency. This region modulation frequency is very low, and has been specifically selected so it can readily be derived from the 57 kHz pilot. Thus, by frequency division by three, a 19 kHz sub-pilot is obtained which, when divided by 32, provides a master sub-pilot of 593.75 Hz which, by selective frequency division by 25, 21, 17, 15, 13 and 11, respectively, provides six region identification frequencies, hereinafter referred to as BK frequencies of 23.75 Hz, 28.27 Hz, 34.93 Hz, 39.58 Hz, 46.67 Hz and 53.98 Hz. These region identification frequencies are modulated on the 57 kHz pilot, and thus characterize the geographic location of the transmitter, e.g. 23.75 Hz for Washington.

The transmitters, as noted, radiate their normal entertainment programs. In addition, and from time to time, they radiate on the same channels which provide the entertainment program (mono-aural or stereo) such traffic information as is appropriate. Since entertainment programs, particularly when listening while driving, are frequently not given sufficient attention, a special signal has been developed to distinguish traffic announcements from other program content. This signal has been allocated a special frequency, the traffic announcement identification frequency, hereinafter DK signal. The DK signal has been allocated 125 Hz, and is obtained from the 19 kHz pilot by dividing the pilot by 152. This signal is employed to switch the receiver, for example by increasing the volume, or by muting a recorder, such as a cassette recorder, another radio, or the like, and switching the reproducing loudspeaker, for example at an elevated volume, to the transmitter which transmits the traffic information. It is assumed, of course, that the automobile radio is turned on. This signal may be used to increase volume to a preset level, regardless of the volume setting of the automobile radio as such. This DK signal preferably persists during the entire time that traffic information is being broadcast.

The decoding elements and circuits for association with standard automobile radio receivers which have been proposed employed, for example, phase-locked loops (PLL) or counters with a clock oscillator, in order to reliably identify the low frequencies which modulate the carrier signal of 57 kHz. Both phase-locked loop (PLL), circuits, or counters and the like require a fair amount of material expenditure.

It is an object of the present invention to provide circuits capable of detecting the respective frequencies in a traffic identification system as above described, which are simple and reliable, while requiring only a minimum amount of components.

SUBJECT MATTER OF THE PRESENT INVENTION

Briefly, pulse transfer and timing circuits are provided, combined with a frequency transfer switch, and a frequency identification circuit, as well as logic elements, which are so connected that the frequency identification circuit can be switched over to identify, selectively, frequencies of the region identification signals (BK signals) as well as of the information frequency identification signals (DK signals). Initially, the BK signals are sensed; if such a signal is present, a first pulse transfer and timing circuit, having a long storage time, is activated to provide an output signal thereat. This output signal persists for a period of time which is longer than the switchover time of the frequency identification circuit. If, during this storage time, an information identification signal, that is a DK signal is received, an output is obtained which is available to control the receiver and, further, is fed back into the logic circuit to provide for self-locking of the circuit for the period of persistence of the DK signal. If the DK signal is not received, then another test for the BK signal is being made, and again stored, and so on. If no BK signal is detected, then the frequency identification circuit will continue to be ready to detect such a BK signal, when received, although no output will be derived from the system, thus permitting use of the automobile radio receiver, as commanded by the user (for example to reproduce tape, entertainment program from the selected station at the desired volume, or the like).

The invention will be described by way of example with reference to the accompanying drawings, wherein.

Figure 1:
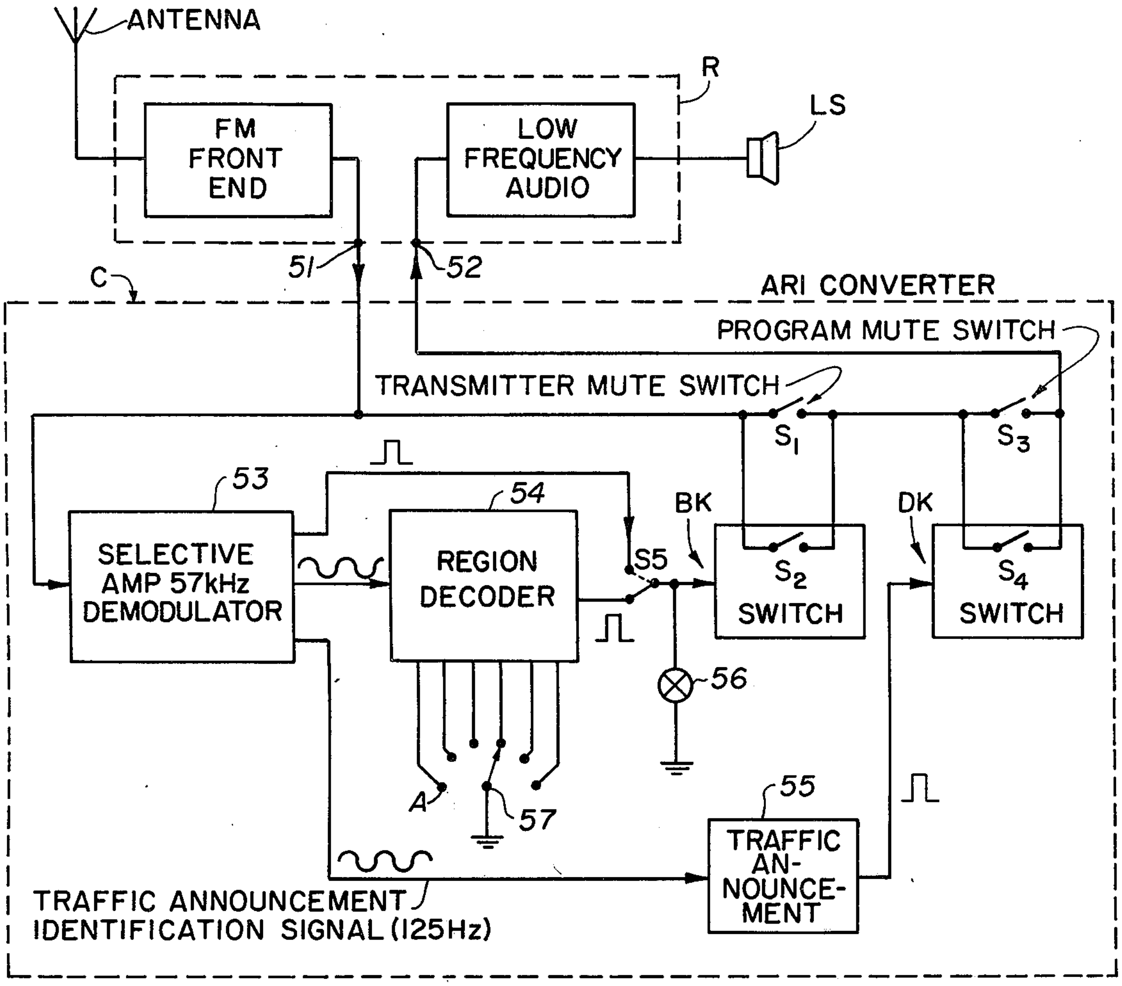
FIG. 1 is a highly schematic block diagram of an automobile radio with an attachment converter to identify, and receive, traffic information signals.

Referring first to FIG. 1: An automobile radio R, connected to an antenna (shown schematically) has an FM front end, that is, radio frequency amplification, tuning circuits, limiter, FM demodulator, and the like, and provides an output at terminal 51. The low frequency and audio portion of the receiver R is connected to a loudspeaker LS. The low frequency and audio portion is fed from a terminal 52. Terminal 52 may, for example, also include a tape player input terminal. Power supply terminals and connection have been omitted.

Terminals 51, 52 are connected to corresponding terminals of an auto radio information (ARI) converter C. The signal from terminal 51 is transmitted to a selective filter-amplifier-demodulator 53. The output from demodulator 53 is applied to a region decoder 54, which is controlled by a region switch 57; to a changeover switch S5; and to a traffic announcement identification decoder 55. A "ready" indicator 56 provides a visual output indication that the receiver R is tuned to a transmitter which radiates traffic information signals. Switch S5 controls an electronic changeover switch S2 in the path of the signal from terminal 51. The traffic announcement decoder 55 controls operation of an electronic switch S4, likewise in the path of the signal between terminals 51 and 52. If switches S1 and S3 are open, for example under manual command from the operator of the vehicle, switches S2 and S4, when controlled by the circuit according to the present invention will, nevertheless, provide transmission of traffic information as received by the receiver R from the tuner or front end section to the low frequency and audio section, for reproduction by loudspeaker LS.

Operation: If the operator merely wishes to use the radio, he manually closes switches S1 and S3. The entertainment program radiated by the particular transmitter to which the front end is tuned will then be reproduced by loudspeaker LS. If the user wishes to obtain any traffic announcement, within the area where traffic announcements are additionally being radiated by selected stations (namely stations radiating a 57 kHz pilot), switch S5 is placed in the dotted position (FIG. 1) and the receiver is then tuned until the ready indicator 56 lights, indicating that a transmitter which broadcasts traffic information is now in tune. This switch is provided if the user is not particular about the transmitter, for example if he wishes to receive general road information, in a surrounding area, without a particular locality being desired (for example, if the operator is in Baltimore, it may be irrelevant whether traffic information is received from a Baltimore station, from the Havre de Grace station, or from Washington). If the operator is particular about the station, however, he will then place the region switch 57 to a selected position, corresponding to the particular transmitter region from which he wishes to receive a program. Let it be assumed that the Washington transmitter has been assigned the lowest modulation frequency, indicated by switch position A, that is, modulation frequency of 23.75 Hz. Switch 57 is then placed at switch position A, and switch S5 is placed in the solid-line position, as shown in FIG. 1. The ready indicator 56 will then light only if the front end of the receiver R is tuned to the particular Washington station.

The particular station can be selected audibly, as well as visually, by opening switch S1. If switch S1 is open, loudspeaker LS is muted, that is, connection of audio programs thereto is interrupted. Tuning the front end of receiver R through its entire tuning range will, however, pick up the Washington transmitter having the modulation frequency A, which not only will light the ready indicator 56 but also control the electronic switch S2 to complete the connection from the front end to the audio section and hence to the loudspeaker LS. Thus, audible, as well as visual indication is being given that a receiver which transmits traffic information is in tune, and, further, that the tuned receiver is the one for the region selected.

The operator may not like to listen to the program, yet still be interested in traffic information. Switch S3 is then opened, again interrupting audio programs from the tuner to the loudspeaker until, however, a traffic announcement identification signal, that is, a DK-signal is received which through traffic announcement identification decoder 55 is decoded to control electronic switch S4 to close, so that the traffice announcement is now transmitted from the tuner, tuned to the proper station, to the audio amplifier and loudspeaker LS. Switch S3 is shown schematically and may, of course, be a transfer switch which selectively connects another tuner section, a cassette recorder, or other program storage system. The present invention is essentially directed to the system which includes elements 54 and 55, that is, to provide control output signals for the respective switches S2, S4. These are the BK and DK signals. As indicated in FIG. 1, these are binary signals of the ON-OFF type, controlling switching of the respective switches S2 and S4.

Figure 3:
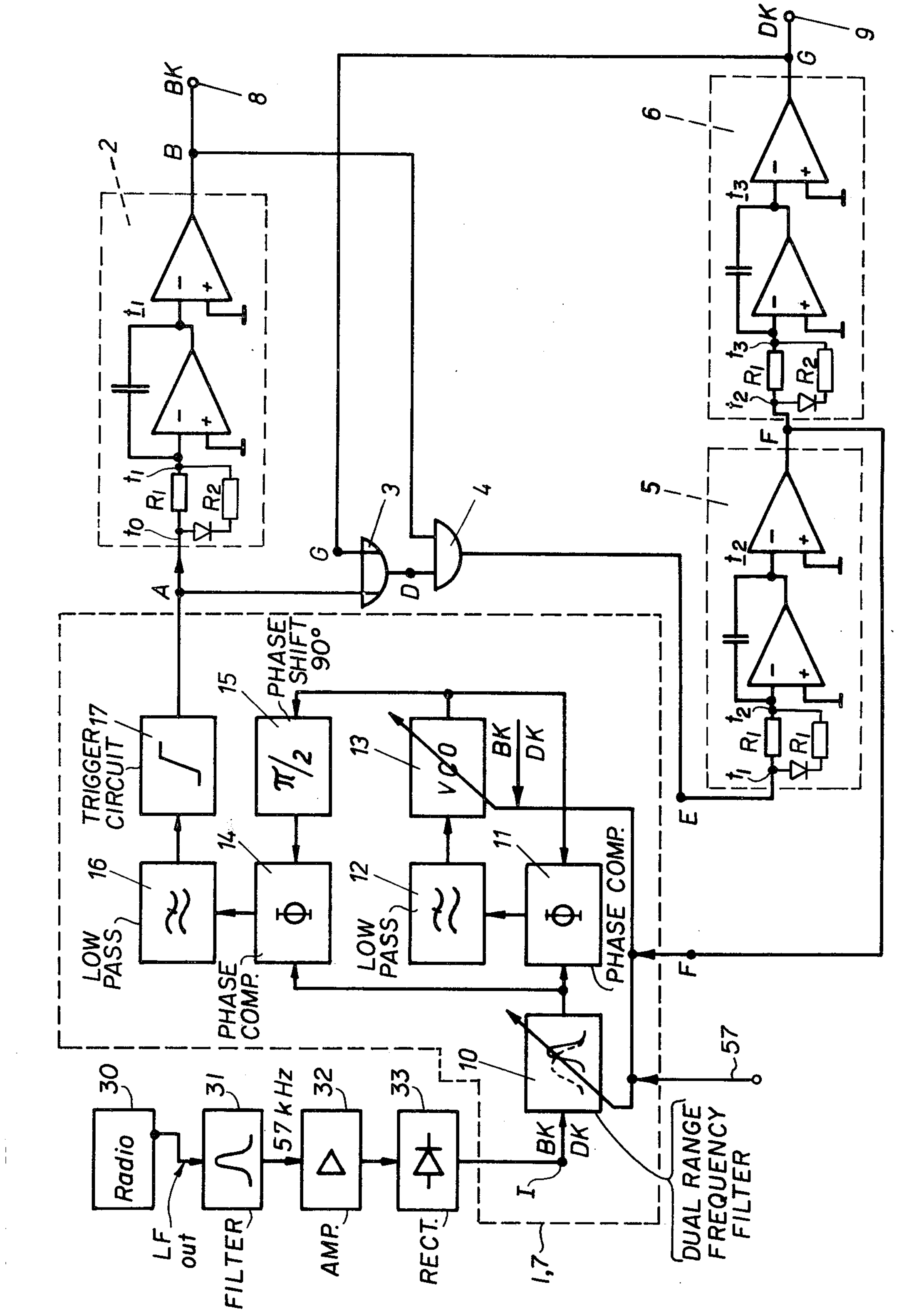
FIG. 3 is a more detailed block diagram of the system of FIG. 2.

Referring now to FIG. 3: The radio tuner 30 is tapped at the low-frequency output, which is connected to a filter 31, separating out the 57 kHz carrier, amplitude modulated by the respective region identification frequencies. The signal is amplified in an amplifier 32 and demodulated in demodulator 33. At demodulator 33, all modulations on the 57 kHz pilot carrier are available at a single terminal. These modulations will, therefore, be of the low region identification frequencies and, if present, of the traffic announcement identification frequency of 125 Hz. They are applied to an input terminal I of the system of the present invention.

Figure 2:
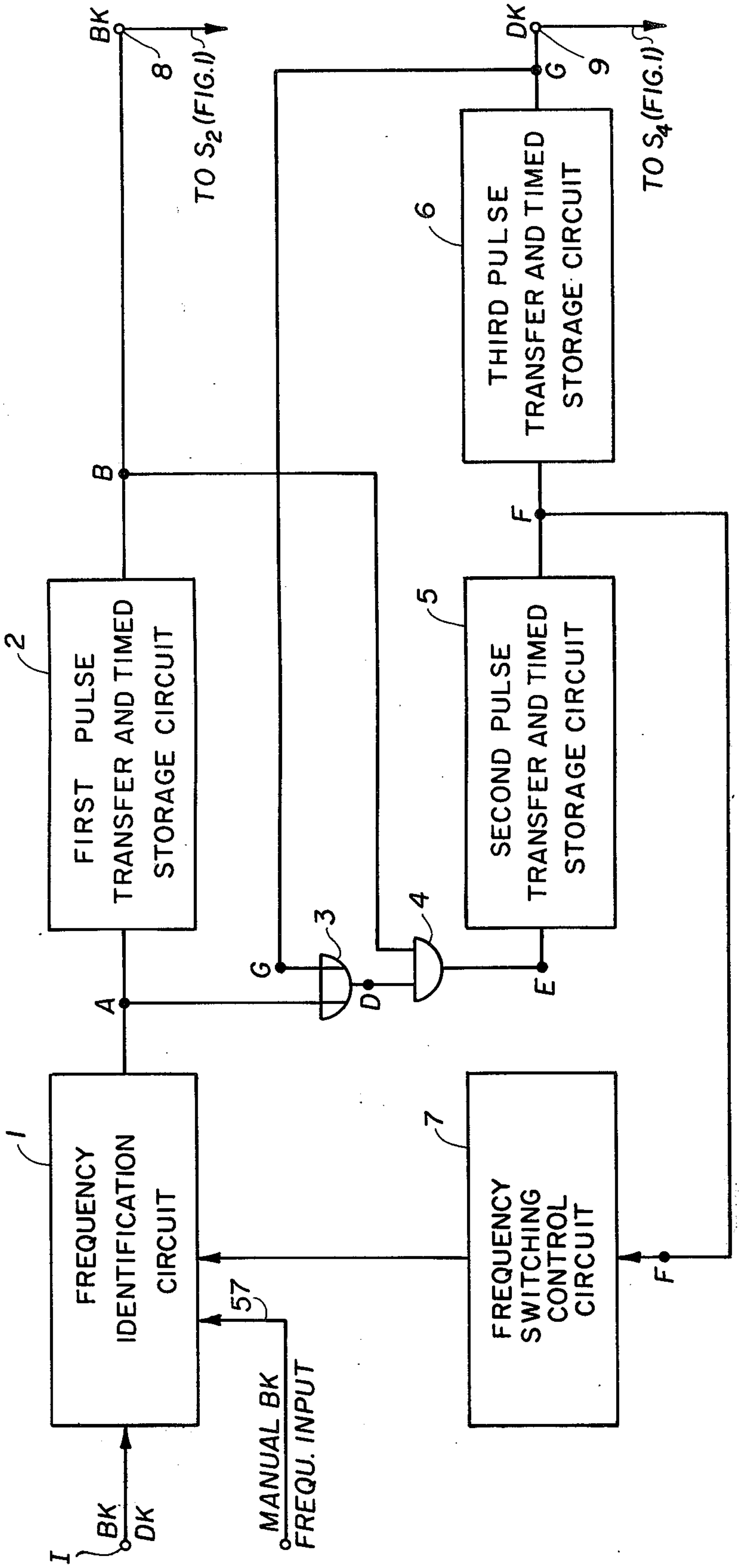
FIG. 2 is a general block diagram of the identification system in accordance with the present invention.

Referring now, generally, to FIG. 2: The circuit according to the present invention utilizes three pulse transfer and timing or storage circuits, which will be briefly referred to as pulse shaper circuits; it must be remembered, however, that these pulse shaper circuits also include storage functions. Each pulse shaper circuit has an individual response time and a storage or decay-delay time. The pulse shapers process digital signals.

The circuit arrangement according to the present invention permits a saving of circuit components. This is possible due to the substantial storage effect of the circuits, which storage effect can be utilized to permit time sharing of a frequency identification circuit for the purpose of interrogating incoming signals at terminal I for the presence of both the traffic announcement identification frequency, that is, the DK signal — while holding information regarding prior interrogation for the region identification frequency, that is, the BK frequency.

The frequency identification circuit, which includes a phase-locked loop (PPL) circuit is capable of being switched to recognize preset frequencies. The setting of the BK frequency is entered by suitable operation of the switch 55. The DK frequency of 125 Hz is preset. The main elements, therefore, are a frequency identification circuit 1, a first pulse shaper 2, a logic circuit including an OR-gate 3 and an AND-gate 4, a second pulse shaper 5, a third pulse shaper 6, and a frequency switching control circuit 7, which commands change over of the frequency identification circuit between the selected BK frequency and the DK frequency. Frequency switch 7 is programmed so that it interrogates the region identification frequency BK when the logic level at point F (FIG. 2) is 0; it switches the frequency identification circuit 1 to interrogate for the DK signal at input terminal I when the logic level in point F is 1.

The frequency identification circuit 1 provides output at its output terminal A in binary form, indicating whether its input has the interrogated frequency BK present. If it is, the output will have a 1-signal appear thereat; if not, the output at terminal A is 0.

The output A of the frequency identification circuit 1 is connected to the first pulse shaper 2. The first pulse shaper 2 has a short response time $t_1$ but a long storage, or decay-delay time $t_1$. A signal indicative of presence of the region identification frequency BK appears at the output B therefrom. Output terminal 8 is connected to electronic switch S2 (FIG. 1) to control closing thereof when the signal at terminal 8 is a 1-signal.

Point A, located at the output of the frequency identification circuit 1, is also connected over one input of the OR-gate 3 and its output to one input of the AND-gate 4. The output of AND-gate 4, appearing at terminal E, is connected to the input of the second pulse shaper 5. The second pulse shaper 5 has a comparatively short response time $t_2$ and a decay-delay, or storage time $t_2$ which is short with respect to the storage time $t_1$. The output from pulse shaper 5 appears at a terminal F which is connected back to control the frequency switching control circuit 7.

The output of the second pulse shaper 5 is connected to a third pulse shaper 6. The response delay time $t_3$ of the third pulse shaper 6 is longer than the storage delay time $t_2$ of the second pulse shaper 5. The output available at point G from the third pulse shaper 6 is connected to terminal 9 which provides the binary DK signal indicative of presence of a traffic announcement identification frequency, when the level at terminal 9 is a 1-signal. This signal is applied to switch S4 (FIG. 1). Output G of the third pulse shaper 6 is additionally connected to the second input of the OR-gate 3; output B of the first pulse shaper 2 is connected to the second input of the AND-gate 4.

OPERATION

Three basic cases will be discussed.

1. Neither the region identification frequency BK, nor the traffic announcement identification frequenced DK are present for an extended period of time.

Each of the points A to G will have a signal thereat of binary level 0. The frequency switch 7 is programmed so that the identification circuit 1 is commanded such that (a) the region identification frequency is interrogated when $F = 0$ and (b) the traffic announcement identification frequency is interrogated when $F = 1$. In the case under discussion, therefore, $F = 0$, the region identification frequency is continuously interrogated. The signal at A will be 0 (no BK and no DK signal), hence the signal at output 8 will likewise be 0 indicative of absence of the BK signal.

2. A region identification signal (BK) is present, but no traffic announcement is being made, that is, no traffic announcement identification frequency (DK) is present. This is the case when the vehicle is travelling in a region where a transmitter provides regional announcements and the receiver is tuned (manually or by an automatic signal search system) to the transmitter carrying such announcements, and is commanded to respond to its signals. Normally, and to start with, as in the preceding case, $F = 0$; thus, the region identification frequency BK is interrogated under command of frequency switching control circuit 7. According to the example, a BK signal is present at input I; thus, point A will have 1-signal appear thereat, which is transferred through the OR-gate to one input of the AND-gate 4. This 1-signal is also transmitted to first pulse shaper 2. The 1-signal appears at output terminal B by the delay of the response delay time $t_1$ of the pulse shaper 2. It will be held thereat at least for the storage time period $t_1$. This signal can be utilized at terminal 8 to effect control functions; it is applied to electronic switch S2 (FIG. 1) to close the switch, and further to illuminate the "ready" indicator 56 which may, for example, be a light-emitting diode (LED). Since both points B and D have a 1-signal, the AND-gate 4 is energized and its output E will likewise have a 1-signal which is applied to the second pulse shaper 5. After a short delay time $t_2$, the output terminal F will have a 1-signal appear thereat, which is fed back to the frequency control circuit 7. The terminal G, that is, the output from pulse shaper 6 is still at 0, however, due to the response delay time $t_3$ of element 6 which is selected to be longer than $t_2$ . Thus, $F = 1$ and $G = 0$ will pertain with respect to the pulse shaper 6.

The level $F = 1$ controls the switching control circuit 7 such that it changes over the frequency identification circuit 1 to interrogate the input signal for the traffic announcement identification frequency DK, that is, changes from the low modulation frequency set by the switch 55 (FIG. 1) to the 125 Hz frequency which identifies traffic identification announcements. Frequency identification circuit 1 will, however, not be able to identify such a frequency (none is presumed present in this example) and hence terminal A will change to a 0-signal. A 0-signal also will still exists at G, so that the output D from the OR-gate 3 will change to a 0-signal, and consequently the output E of the AND-gate will go to a 0-signal as well. After the delay storage time $t_2$ of the second pulse shaper 5, terminal F will also go to a 0-signal. Hence, frequency switching control circuit 7 will change over, and command the frequency identification circuit 1 to again interrogate the region identification frequency BK, and repeating the cycle.

The effect of this cycle is: The region identification frequency BK is continuously interrogated and, as soon as a signal at that frequency is sensed, a 1-output is obtained which is stored. During that storage time, the frequency identification circuit changes over to interrogate its input for presence of the DK frequency. If none is present during the storage time, the frequency identification circuit 1 will again revert to further interrogation for the BK signal which, if continuously present, will extend the storage time at the output of the first pulse shaper 2, permitting again interrogation for the DK frequency, and so on.

At this place, it is important to note that the decay-delay, or storage time $t_1$ of pulse shaper 2 is considerably longer than the decay-delay or storage time $t_2$ of the pulse shaper 5. As a result, the just described interrogation of the traffic announcement identification frequency DK does not change the signal at point B, or at the output 8 thereof, and the presence of a region identification frequency BK will remain indicated at terminal 8, and thus the ready indicator 56 will remain lit, and electronic switch S2 will remain closed.

When the region identification frequency BK is interrogated, the cycle described will start again. On presence of a region identification frequency BK, and simultaneous absence of a traffic announcement identification frequency DK, frequency switch 7 periodically commutates to command the identification circuit 1 to switch between the two frequencies BK and DK, while the presence of the region identification frequency is continuously indicated, and commands the apparatus by the signal at terminal 8, due to the long storage time $t_1$. This time $t_1$ is selected to be substantially longer than the time for interrogating the traffic announcement identification frequency DK.

Continuous absence of the traffic announcement identification frequency DK is indicated at terminal 9 by a 0-signal due to the response delay time $t_3$ of the third pulse shaper 6. This time $t_3$ is selected to be longer than the time for interrogating the region identification frequency BK by the frequency identification circuit 1, under command of its control circuit 7.

3. Both the region identification frequency BK and the traffic announcement frequency DK are present. This situation will arise when a traffic announcement is imminent and the receiver is tuned to the station broadcasting the announcement. In accordance with a preferred embodiment of the system, the DK frequency will persist during the announcement, although this is not strictly necessary, since the controlled electronic switch S4 (FIG. 1) could be constructed to be a latching switch, to hold until another signal of the DK frequency is received, effecting release, unless manually released.

The considerations leading to the state of a 1-signal at point F and a 0-signal at point G, in connection with the situation (2) above apply equally and are identical. When point F has a 1-signal thereat, the frequency identification circuit switches over and, contrary to the situation in (2) above, since the DK signal is present, point A will have a 1-signal appear thereat. This 1-signal is transmitted through the OR-gate 3 to one input of the AND-gate 4. Due to the long storage time $t_1$ of first pulse shaper 2, the second input of the AND-gate 4 will likewise have a 1-signal thereat which causes a 1-signal at terminal E, and, with a delay time $t_2$ of the second pulse shaper 5, a 1-signal at point F. The 1-signal at point F thus continues, controlling the frequency control circuit 7 to continue interrogation of the DK traffic announcement frequency by the frequency identification circuit 1. After the response delay time $t_3$ of element 6 has elapsed, point G will likewise have a 1-signal appear thereat, and will retain this signal. This means that the traffic announcement identification frequency DK has been identified at terminal 9, and the signal can be utilized, in the example selected to control electronic switch S4 (FIG. 1).

The 1-signal at terminal G is applied through the OR-gate 3 to one input of the AND-gate 4, thus locking the circuit, independently of temporary change of the signal state at terminal A. The storage effect of the first pulse shaper 2 is also utilized for analysis of the signal with respect to information about the traffic announcement identification frequency DK. A 0-signal at terminal G can arise only when a 0-signal from the frequency identification circuit 1 is effective during a period which is longer than the storage effect of the first pulse shaper 2, so that point B can assume a 0-state.

Referring now to FIG. 3, in which the circuit generally described with respect to FIG. 2 is shown in greater detail: The radio 30 provides a low-frequency output to a 57 kHz filter 31, the output of which is connected to an amplifier 32, and demodulated in a rectifier-demodulator 33. The output signal is available at terminal I.

The frequency identification circuit 1 and the frequency switching-control circuit 7, together, comprise a phase-locked loop (PLL) circuit which includes a switchable frequency filter 10, connected to a phase comparator 11. The phase comparator 11 compares the phase of the signal from the switchable filter 10 and an input from a local oscillator 13, which is a voltage-controlled oscillator. The output from the phase comparator is connected to a low-pass filter, the output of which is likewise fed into the voltage-controlled oscillator. The phase comparator 11, the low-pass filter 12, and the VCO 13 form a PLL, as known. The terminal F, as schematically indicated in FIG. 3, is connected to control the filter range of filter 10, and the oscillator frequency of VCO 13 by controlling the voltage thereof. Control is effected to switch between the respective selected frequency of the BK signal, and of the DK signal, respectively. Setting of the selected BK signal is schematically indicated by the arrow 55 (see FIG. 1).

The output signal from the filter 10 and the output signal of VCO 13, phase-shifted by 90° by a phase shifter 15, are compared in a second phase comparator 14. The output from phase comparator 14 is connected through a low-pass filter 16 to a trigger circuit 17. Trigger circuit 17 provides a binary output signal, which is a 1-signal if terminal I has a signal appear thereat of the frequency to which the circuit is set to respond, as determined by the signal at terminal F. The pulse transfer and time storage circuits 2, 5, 6 may all, essentially, be similar. The input circuit includes a diode resistor network to provide different response and decay delay times, connected to the inverting input of an operational amplifier, switched as an integrator. The integrating time constant will be determined by the effective resistance of the network depending on the respective input signal of the circuit. The output from the operational amplifier is connected to a further operational amplifier, connected as a limiter amplifier.

The system of the present invention can be used both with manually tuned receivers, as well as with automatically tuned receivers. The BK signal can be used to control the signal search circuit of an automatically tuned receiver. The modulating BK frequencies are very low and, while in an automatically tuned receiver the search speed can be matched to the response time of the circuit input, manual tuning may cause difficulties. The BK signal, if selected with a normal active tuned circuit, or with a narrow band PLL, would have a response time which may be too long to enable tuning in and response of the circuit, if rapid manual tuning across the dial of the tuner of the radio 30 (FIG. 3) is effected. For instance, the response time, in the worst case, could be in the order of about ½ second, which is far too long. The circuit arrangement of the present invention permits rapid lock-in and responds to provide the separated-out, recognized BK signal at terminal 8 if it is detected upon tuning the radio 30 across its tuning range.

The system of the present invention, therefore, permits detection, first, if a transmitter, to which the receiver is being tuned, radiates the 57 kHz carrier indicative of the fact that this transmitter periodically broadcasts traffic information; further, if the 57 kHz carrier is modulated with the proper BK region identification frequency, selected by the operator by switch 55 (FIG. 1). An output signal is then provided indicative of this state of tuning of the receiver. Further, the circuit permits recognition if the transmitter radiates the carrier with the modulation indicative of an imminent traffic announcement, that is, the DK frequency, which is the traffic announcement identification frequency. If this frequency is detected, an additional control signal is available at terminal 9, to effect other control functions, for example disabling a previous program being reproduced over the audio section of the receiver and, instead, connecting the tuned station which has the traffic information at a given volume. Only a single circuit is used to effect selection of the respective frequency by using a frequency identification circuit which, preferably, includes a PLL circuit, the frequency response to which is automatically switched, as selected by the operator, to the respective BK frequency and, upon detection of the presence of this frequency at the output of the receiver, repetitive cyclical switching is then effected between the BK frequency and the DK frequency, without any operator intervention, so that the operator will receive, automatically, the traffic announcement regardless of prior setting of the automobile radio.

Various changes and modifications may be made within the scope of the inventive concept. The carrier frequencies and the modulation frequencies described herein are only illustrative and may be varied, as desired. They have been found useful and, in actual tests, no annoying interference with normal broadcast reception, by stationary or mobile receivers not having these features, and not desiring to automatically respond to traffic announcement stations and traffic announcements, was found.

Suitable timing periods for the circuits in the present invention are:

| | | | |
|---|---|---|---|
| Pulse shaper 2: | response delay | $t_1$: | 0,2 sec |
| | storage time | $t_1$: | 1,0 " |
| Pulse shaper 5: | response delay | $t_2$: | 0,1 " |
| | storage time | $t_2$: | 0,2 " |
| Pulse shaper 6: | response delay | $t_3$: | 0,6 " |
| | storage time | $t_3$: | 1,0 " |

We claim:

1. Circuit arrangement for frequency identification in the field of broadcast traffic information reception in which the identification is effected in identification cycles comprising a frequency identification circuit (1) responding to, recognizing and identifying signals (BK, DK) of different, predetermined frequencies including a region identification frequency (BK) and a traffic announcement identification frequency (DK), and providing a binary output signal indicative of the presence or absence of a selected, predetermined frequency to be identified;

a first pulse shaper (2) which has a short response time ($t_1$) and a long storage time ($t_1$) of such duration that several frequency identification cycles can be performed within the storage time period, said pulse shaper being connected to the frequency identification circuit (1) and providing, at its output (B) terminal (8) information concerning the presence of the region identification frequency (BK);

an AND-gate (4), the output (B) terminal (8) of the pulse shaper (2) being connected to one of the inputs of the AND-gate (4) and the output of the frequency identification circuit (1) being connected to a second input of the AND-gate (4);

a second pulse shaper (5) having a relatively short response delay time ($t_2$) and a storage time ($t_2$) which is short with respect to the storage time ($t_1$) of the first pulse shaper (2), and having its input connected to the output of the AND-gate (4);

a third pulse shaper (6) having its input connected to the output of the second pulse shaper (5), said third pulse shaper having a response delay time ($t_3$) which is longer than the storage time ($t_2$) of the second pulse shaper (5) and providing at its output (G) terminal (9) information concerning the presence of the traffic announcement identification frequency (DK), and a frequency control circuit (7) connected to the output of said second pulse shaper (5), said frequency control circuit (7) being connected to control the recognition, or identification frequency response of said frequency identification circuit (1) to respond to, identify, and provide an output upon presence of the region identification frequency (BK) if the frequency control circuit (7) does not receive an output from the second pulse shaper (5) and to control said frequency identification circuit (7) to change its response range to identify the traffic announcement identification frequency (DK) when energized from said second pulse shaper (5); whereby 1. absence of the region identification frequency (BK) will result in no output from the identification circuit (1) and hence continuous control by the frequency control circuit (7) to continue the state of the frequency identification circuit to select and identify said regional frequency (BK), and 2. if the region identification frequency (BK) is identified, energization of the second pulse shaper (5) will cause change in the state of the frequency control circuit (7) and hence command the frequency identification circuit (1) to change to select for identification the traffic announcement frequency (DK), energization of the output terminal (8) of the first pulse shaper (2) continuing due to the long storage time ($t_1$) thereof and, upon non-detection of a traffic announcement frequency (DK), reversion of the state of the frequency control circuit (7) to control the frequency identification circuit (1) to again select the region identification frequency (BK), and thus extend the storage time ($t_1$) of the first pulse shaper; and, 3. if the traffic announcement identification frequency (DK) is detected, the system will be held in the state in which the frequency control circuit (7) continues to command the frequency identification circuit (1) to select and identify the traffic announcement identification frequency (DK) and simultaneously continue to energize said first pulse shaper (2), thus continuously extending the storage time ($t_1$) thereof.

2. System according to claim 1, wherein the frequency identification circuit (1) and the frequency control circuit (7) comprise a filter and a phase-locked loop, the phase-locked loop including a voltage-controlled oscillator, and the filter being a switchable filter, the frequency control circuit (7) controlling the voltage of the voltage-controlled oscillator, and switching of said filter (10).

3. System according to claim 1, further comprising an OR-gate, connected to supply the second input to the AND-gate, said OR-gate having as inputs: (a) the output of the frequency identification circuit (1), and (b) the output of the third pulse shaper (6).

4. Frequency identification and control system to detect occurrence of selected frequencies in a frequency spectrum and to provide digital output signals indicative of the presence or absence of selected frequencies in a frequency spectrum comprising a frequency identification circuit (1) having first means (10–15) selectively responding to said selected frequencies and second means (16, 17) providing a digital output signal indicative of the presence or absence of the frequency selected by said first means;

first storage means (2) having a first storage time ($t_1$) responsive to said frequency identification circuit (1) and providing an output signal during said storage time when the frequency identification circuit provides a digital output signal indicative of the presence of the frequency selected by said first means;

second storage means (5) having a second storage time ($t_2$) which is short with respect to said first storage time;

a frequency selection control circuit (7) connected to and controlling said frequency identification circuit (1) to change its frequency response from a first selected frequency to another selected frequency in dependence on the output signal from said frequency selection control circuit (7);

logic circuit means (3, 4, 6) connected to the output of said frequency identification circuit (1) and said first storage means (2), and controlling said second storage means (5) to provide an output after said second storage time ($t_2$) to said frequency selection control circuit (7) to control the frequency identification circuit (1) to select a different frequency identification and to maintain the circuit for the identification of said different selected frequency for the duration of said second storage time ($t_2$);

the logic circuit means being further connected to the output of said second storage means (5) and providing a feedback and self-locking circuit to hold said output of said frequency identification circuit (1) in a state which will effect response of both the first storage means (2) and the second storage means (5), but permit cut-off of response of the second storage means (5) and hence reversion of the frequency control circuit (7) to command the frequency identification circuit to revert to response to the first selected frequency upon failure of the frequency identification circuit (1) to detect said other selected frequency, after lapse of said second storage time ($t_2$) but during continued persistence of the first storage time ($t_1$).

5. System according to claim 4, wherein the storage time ($t_2$) of said second storage means (5) is long with respect to the storage time ($t_1$) of said first storage means.

6. System according to claim 4, wherein said logic circuit means comprises a third storage means (6) and an AND-gate (4), the AND-gate being connected to the input of the second storage means and being effective upon conjunction of: output from said first storage means (2) and detection of the specific frequency.

7. System according to claim 4, wherein said frequency identification circuit (1) is cyclically controlled by said frequency selection control circuit (7) to select for identification, alternately, said selected frequencies;

the storage time ($t_1$) of said first storage means (2) being longer than one complete cycle of change-over of frequency identification between said selected frequencies of the frequency identification circuit (1);

and wherein the logic circuit means provides an output to said second storage means (5) to in turn control the frequency selection control circuit to interrupt cyclical change-over of the frequency identification circuit (1) between said selected frequencies and instead hold said frequency identification circuit in the state which permits response to and continuous identification of said predetermined one of the selected frequencies.

* * * * *